US009869989B2

(12) United States Patent
Yoshida et al.

(10) Patent No.: US 9,869,989 B2
(45) Date of Patent: Jan. 16, 2018

(54) NUMERICAL CONTROLLER (71) Applicant: FANUC Corporation, Minamitsuru-gun, Yamanashi (JP)

(72) Inventors: Kouei Yoshida, Minamitsuru-gun (JP); Shuji Ogawa, Minamitsuru-gun (JP)

(73) Assignee: FANUC CORPORATION, Minamitsuru-gun, Yamanashi (JP)

(*) Notice: Subject to any disclaimer, the term of this patent is extended or adjusted under 35 U.S.C. 154(b) by 323 days.

(21) Appl. No.: 14/618,194

(22) Filed: Feb. 10, 2015

(65) Prior Publication Data
US 2015/0227129 A1 Aug. 13, 2015

(30) Foreign Application Priority Data
Feb. 12, 2014 (JP) ................. 2014-024842

(51) Int. Cl.
G05B 19/18 (2006.01)
B23G 1/04 (2006.01)

(52) U.S. Cl.
CPC .............. G05B 19/182 (2013.01); B23G 1/04 (2013.01); G05B 2219/45215 (2013.01)

(58) Field of Classification Search
CPC .... G05B 19/18; G05B 19/182; G05B 19/186; G05B 2219/37435; G05B 2219/41115; G05B 2219/41256; G05B 19/45215; G05B 19/49077; G05B 2219/50225; B23Q 15/02; B23Q 17/0976; B23Q 17/20; B23G 3/04; B23G 2240/36; Y10T 82/20
See application file for complete search history.

(56) References Cited

U.S. PATENT DOCUMENTS 4,580,225 A * 4/1986 Thompson ........... G05B 19/186
                                                    318/573
4,723,219 A * 2/1988 Beyer ................ G05B 19/4067
                                                    318/572
7,123,984 B2 * 10/2006 Tanaka ..................... B23G 1/02
                                                    700/193

(Continued)

FOREIGN PATENT DOCUMENTS

CN 102079033 A 6/2011
CN 102554692 A 7/2012

(Continued)

OTHER PUBLICATIONS

The Notification of the First Office Action dated Jan. 12, 2017 in Chinese Patent Application No. 2015100728545 (6 pages) with an English Translation (8 pages).
Notification of Reasons for Refusal dated Jul. 21, 2015 in Japanese Patent Application No. 2014-024842 (2 pages) with an English Translation (2 pages).

Primary Examiner — Crystal J Barnes-Bullock
(74) Attorney, Agent, or Firm — Drinker Biddle & Reath LLP (57) ABSTRACT A numerical controller is configured to move a tool in synchronism with rotation of a workpiece, thereby controlling a machine tool configured to perform thread cutting, and comprises a cutting amount variation setting unit for previously setting the size of a variation of a cutting amount during the thread cutting. The cutting amount variation setting unit periodically changes the cutting amount based on a preset variation during the thread cutting.

2 Claims, 8 Drawing Sheets (56) References Cited

U.S. PATENT DOCUMENTS

| | | | |
|---|---|---|---|
| 7,341,501 B2 * | 3/2008 | Yanase | B23F 23/1225 451/10 |
| 8,186,254 B2 * | 5/2012 | Nonaka | B25J 15/04 156/510 |
| 8,726,711 B2 * | 5/2014 | Flegel | F16L 15/06 470/70 |
| 9,063,533 B2 * | 6/2015 | Nakamura | G05B 19/182 |
| 9,110,455 B2 * | 8/2015 | Ueno | G05B 19/18 |
| 9,138,848 B2 * | 9/2015 | Ueno | B23Q 17/0976 |
| 9,417,619 B2 * | 8/2016 | Irie | G05B 19/182 |
| 9,468,985 B2 * | 10/2016 | Tezuka | B23G 3/08 |
| 2004/0128018 A1 | 7/2004 | Sugie | |
| 2009/0069927 A1 | 3/2009 | Suzuki et al. | |
| 2010/0135740 A1 * | 6/2010 | Harif | B23B 1/00 408/1 R |
| 2012/0101624 A1 | 4/2012 | Ueno | |
| 2014/0200707 A1 | 7/2014 | Irie et al. | |

FOREIGN PATENT DOCUMENTS

| | | |
|---|---|---|
| CN | 103941636 A | 7/2014 |
| JP | S58-117007 A | 7/1983 |
| JP | 2001-096403 A | 4/2001 |
| JP | 2004-209558 A | 7/2004 |
| JP | 2009/078350 A | 4/2009 |
| JP | 2012-056066 A | 3/2012 |

* cited by examiner

NUMERICAL CONTROLLER

BACKGROUND OF THE INVENTION

Related Application Data

This application claims priority under 35 U.S.C. §119 and/or §365 to Japanese Application No. 2014-024842 filed Feb. 12, 2014, the entire contents is incorporated herein by reference.

Field of the Invention

The present invention relates to a numerical controller for controlling a machine tool, and more particularly, to a numerical controller having a function of suppressing chattering during thread cutting.

Description of the Related Art

If chattering, that is, vibration of a tool tip point or the like, is caused during thread cutting, problems usually occur such as degradation of a machined surface, tool breakage, etc. It is known that this type of chattering can be suppressed by changing the spindle speed during thread cutting.

In general, changing the spindle speed during thread cutting is subject to the problem of a phase error with respect to the relationship between the spindle position and feed axis position. To solve this phase error problem, a well-known device disclosed in Japanese Patent Application Laid-Open No. 2004-209558 is used to change the spindle speed without a phase error during thread cutting. This device requires a detector or spindle motor corresponding to position control. Besides, there is a conventional tool having the function of suppressing chattering (see Japanese Patent Application Laid-Open No. 2001-096403).

The prior art techniques described in the background art can overcome chattering during thread cutting. However, the technique disclosed in Japanese Patent Application Laid-Open No. 2004-209558 depends on the detector or spindle motor, and Japanese Patent Application Laid-Open No. 2001-096403 on a tool.

SUMMARY OF THE INVENTION

Accordingly, in view of the problems of the prior art described above, the object of the present invention is to provide a numerical controller for controlling a machine tool, capable of suppressing chattering without depending on a detector, spindle motor, or tool and having a function of suppressing chattering during thread cutting.

In some embodiments of the present invention, chattering is suppressed by changing the cutting amount when the chattering is caused during the executing of thread cutting or by performing the thread cutting while periodically changing the cutting amount from the beginning.

A numerical controller according to the present invention is configured to rotate a workpiece about a rotation axis and moves a tool along the rotation axis in synchronism with the rotation about the rotation axis, thereby controlling a machine tool for performing thread cutting in the workpiece, and comprises a cutting amount variation setting unit for previously setting the size of a variation of a cutting amount during the thread cutting. The thread cutting is continued with the cutting amount changed based on the set variation when the change of the cutting amount is ordered by the cutting amount variation setting unit during the thread cutting, the tool is moved with acceleration of a predetermined value or higher along the rotation axis from a predetermined position to a start point in a position along the rotation axis near a position along the rotation axis in which the cutting amount is changed and deviated from a start point of the thread cutting by a distance equal to an integral multiple of a lead after the thread cutting with the changed cutting amount is performed, and the thread cutting is performed with the unchanged cutting amount, starting at the deviated start point.

The numerical controller according to the present invention is configured to move a tool in synchronism with rotation of a workpiece, thereby controlling a machine tool for performing thread cutting, and comprises a cutting amount variation setting unit for previously setting the size and period of a variation of a cutting amount during the thread cutting. The cutting amount variation setting unit periodically changes the cutting amount based on a preset variation during the thread cutting.

According to the present invention arranged as described above, there can be provided a numerical controller for controlling a machine tool, capable of suppressing chattering without depending on a detector, spindle motor, or tool and having a function of suppressing chattering during thread cutting.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
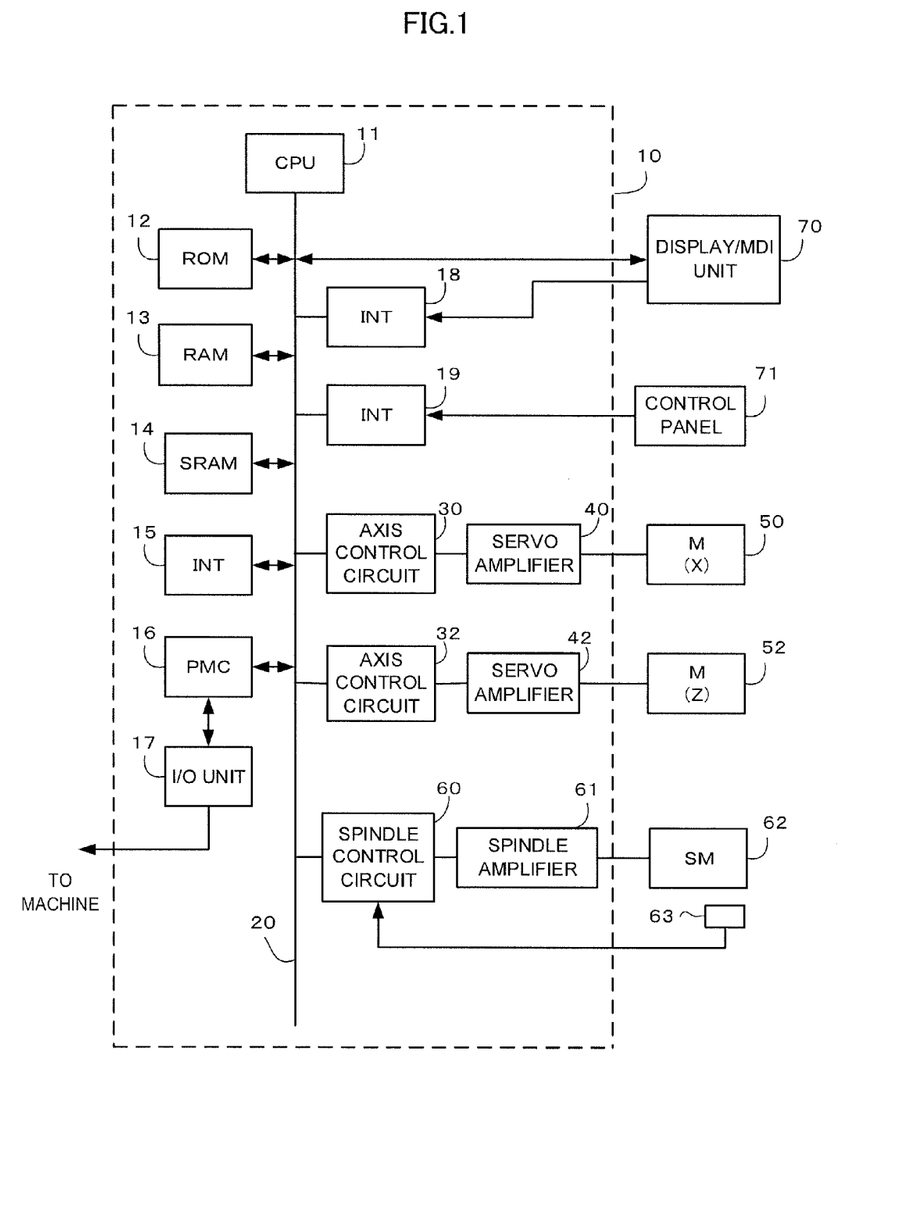
FIG. 1 is a diagram illustrating a thread cutting device according to the present invention.

FIG. 1 is a diagram illustrating a thread cutting device according to one embodiment of the present invention. A CPU 11 is a processor for generally controlling a numerical controller 10. The CPU 11 reads system programs stored in a ROM 12 through a bus 20 and controls the entire numerical controller according to the system programs. A RAM 13 is stored with temporary calculation data, display data, and various data input by an operator through a display/MDI unit 70. An SRAM 14 is constructed as a nonvolatile memory that can maintain its storage state even after the numerical controller 10 is switched off. The SRAM 14 can be stored with a machining program read through an interface 15, a machining program input through the display/MDI unit 70, etc. Numeral 16 denotes a PMC; 17, an I/O unit; and 18 and 19, interfaces.

Axis control circuits 30 and 32 receive move commands for individual axes from the CPU 11 and output them to servo amplifiers 40 and 42. On receiving these commands, the servo amplifiers 40 and 42 drive servomotors 50 and 52 for the axes, respectively. The servomotors 50 and 52 individually incorporate position/speed detectors such that position/speed feedback signals from the position/speed detectors are fed back to the axis control circuits 30 and 32 to perform position/speed feedback control. The position/speed feedback is not illustrated in FIG. 1.

The servomotors 50 and 52 serve to drive X- and Z-axes of a machine tool. A spindle control circuit 60 receives a spindle rotation command S from the CPU 11 and further receives a spindle position feedback signal from a spindle position sensor 63 for detecting the spindle position of a spindle motor (SM) 62. Then, the spindle control circuit 60 outputs a spindle speed signal to a spindle amplifier 61. On receiving the spindle speed signal, the spindle amplifier 61 drives the SM 62 to rotate at a commanded speed.

The CPU 11 analyzes the machining program and drivingly controls the servomotors 50 and 52 for the X- and Z-axes through the axis control circuits 30 and 32. The SM 62 is controlled for rotation by the spindle control circuit 60 based on the spindle rotation command S given by the machining program and the spindle position feedback signal from the spindle position sensor 63. The control is based on the spindle position as a master and feed axes (X- and Z-axes) as slaves. If thread cutting is performed with the spindle rotated at a predetermined speed, therefore, it can be achieved with high machining accuracy, since the spindle speed relative to the Z-axis is kept constant.

Embodiment 1

The following is a description of Embodiment 1 included in claim 1.

Figure 2:
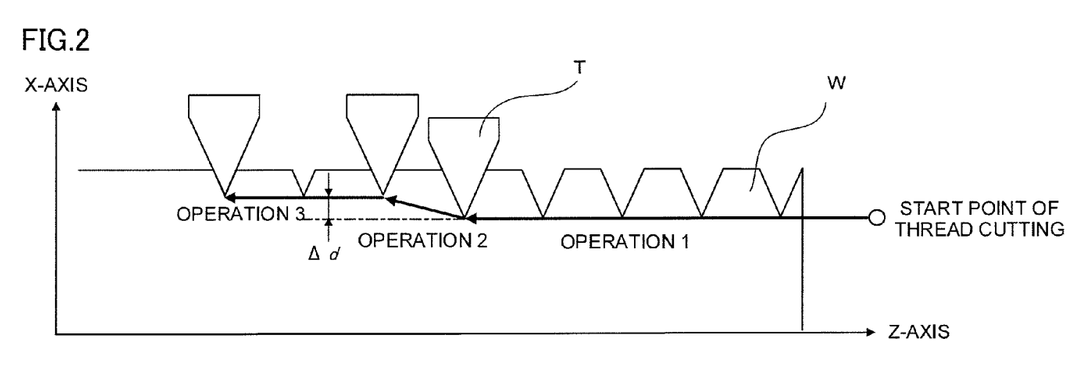
FIG. 2 is a diagram showing the change of a cutting amount during thread cutting.
Figure 3:
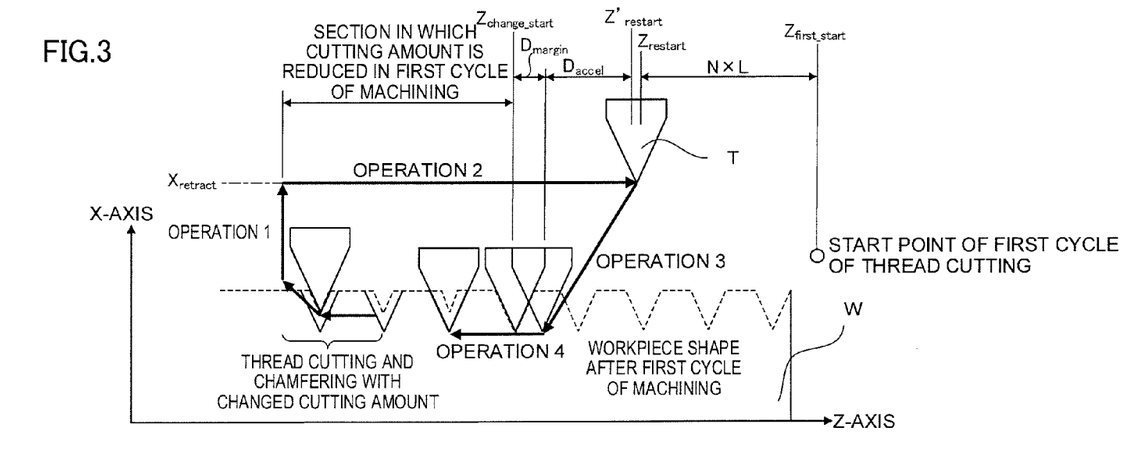
FIG. 3 is a diagram showing a machining path in a section for the change of the cutting amount.

FIG. 2 is a diagram showing the change of the cutting amount during the thread cutting. FIG. 3 is a diagram showing a machining path in a section for the change of the cutting amount. Symbols T and W designate a tool and a workpiece, respectively.

According to the present embodiment, the tool is moved in the direction of the X-axis to change the cutting amount, as in Operation 2 of FIG. 2, when a signal is input to the numerical controller 10 while the thread cutting to a certain depth is being performed, as in Operation 1 of FIG. 2. Thereafter, the thread cutting is continued to the changed depth, as in Operation 3 of FIG. 2. In general, the cutting force is reduced as the cutting amount is reduced. Further, the occurrence of chattering depends on the magnitude of the cutting force. Thus, chattering is expected to be suppressed by reducing the cutting amount.

The variation of the cutting amount required for the suppression of chattering varies depending on the machine or tool used, material and shape of the workpiece, and spindle speed. Therefore, the variation ($\Delta d$ in FIG. 2) of the cutting amount is designed to be arbitrarily settable by a parameter or command.

The change of the cutting amount is ordered by inputting a signal to the numerical controller 10 by a button or detector on a control panel 71. If the order of the change of the cutting amount is designed to be input to the numerical controller 10 when the operator depresses the button on the control panel 71, the operator can change the cutting amount in the workpiece W by the tool T at arbitrary timing. If a detector such as a microphone (not shown) is used for the signal input, moreover, the change of the cutting amount caused when chattering is detected can be automated.

After the thread cutting is continued, as in Operation 3 of FIG. 2, an operation to perform the thread cutting again in a section in which the cutting amount is reduced is generated and executed in the numerical controller 10. The workpiece can be machined into an originally intended shape by cutting off a portion that is originally intended to be removed by this series of operations. Since the cutting amount at this point in time is smaller than that at the occurrence of chattering, the occurrence of chattering can be suppressed.

In FIG. 3, Operation 1 is an escape operation; Operation 2, a movement to a second thread cutting start point; Operation 3, an operation to bring the tool close to a previously machined thread groove while accelerating the movement in the Z-axis direction; and Operation 4, an operation to perform thread cutting to a depth of cut for the previous thread cutting. This series of operations should be designed in consideration of the following requirements (a) to (d).

(a) The end point of the escape operation should be located in a position that does not interfere with the workpiece.

(b) The distance for the acceleration in the Z-axis direction should be sufficiently long.

(c) The machining should be done along a thread groove formed by a first cycle of machining (Machined without a phase difference with a first cycle of thread cutting).

(d) There should be no uncut areas.

Since the proper value for a movement amount $X_{retract}$ for the escape operation (a) depends on the shape of the workpiece W, a user is allowed to set an arbitrary value based on a parameter or command. In consideration of the requirements (b) to (d), moreover, a coordinate ($Z_{restart}$) of a start point in the Z-direction is calculated as follows in the numerical controller:

$Z_{restart}$ designates that one of positions at distances equal to integral multiples of the lead from $Z_{first\text{-}start}$ which is larger than $Z'_{restart}$ and closest to $Z'_{restart}$. $Z_{restart}$ corresponds to "a position near a position along the rotation axis in which the cutting amount is changed" of claim 1.

$$Z'_{restart} = Z_{change\text{-}start} + D_{margin} + D_{accel}.$$

The following is a description of these variables.

$Z_{first\text{-}start}$: A start point of a first cycle of thread cutting (previously stored in the numerical controller when the first cycle of thread cutting is performed).

$Z_{change\text{-}start}$: A Z-axis coordinate of a position in which the cutting amount is changed in the first cycle of thread cutting (previously stored in the numerical controller when the cutting amount is changed).

$D_{margin}$: The difference between a start point for Operation 4 and the Z-axis coordinate of the position in which the cutting amount is changed (arbitrarily set by the user based on a parameter or command).

$D_{accel}$: A necessary distance for the acceleration in the Z-axis direction (arbitrarily set by the user based on a parameter or command), corresponding to "a position in which good acceleration can be achieved" of claim 1.

The start point for Operation 3 is deviated from the start point of the first cycle of thread cutting by a distance equal to an integral multiple of the lead, in order to avoid a phase error relative to the first cycle of thread cutting. Further, the start point for Operation 4 is deviated from $Z_{change\text{-}start}$ by $D_{margin}$ because uncut areas may possibly be produced due to detection, control, mechanical errors, etc., if cutting is barely started at $Z_{change\text{-}start}$ without a deviation. Since the value to be set for $D_{margin}$ can be assumed to vary depending on the machine, it is arbitrarily set by the user. Further, the value to be set for $D_{accel}$ can also be assumed to vary depending on the machine, so that it is arbitrarily set by the user.

Since these operations to overcome chattering can be performed without depending on the detector (spindle position sensor 63), spindle motor (SM 62), or tool T, they are applicable to a wide variety of machines. Since the change of the cutting amount and a second thread cutting operation are created in the device, moreover, the operator can perform the machining by only setting some movement amounts based on parameters or commands. Thus, the operator can easily perform the machining with small burden.

Figure 4:
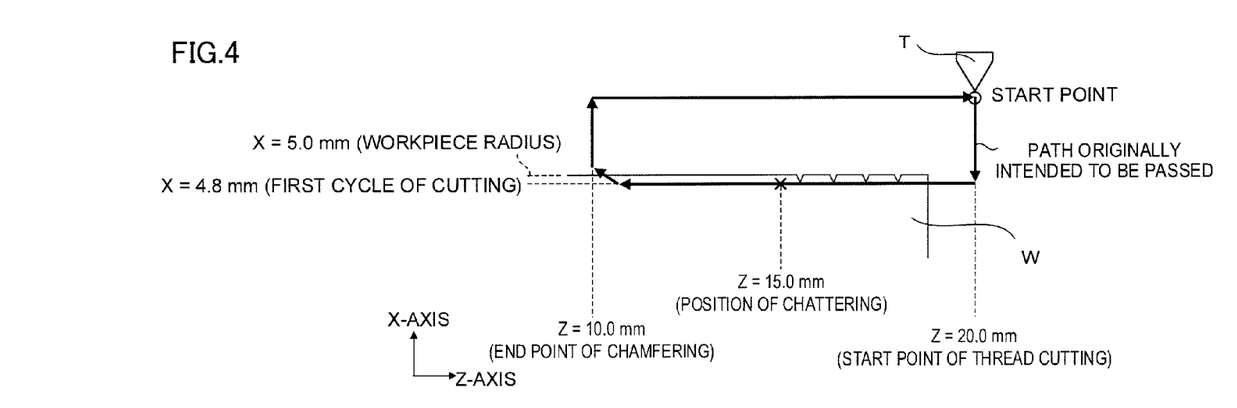
FIG. 4 is a diagram showing condition setting of an example of execution.

Example of execution included in claim 1:

Let us assume a case in which chattering is caused in a position given by Z=15.0 (mm) when thread cutting is to be done along the path shown in FIG. 4. The lead of the thread cutting and the radius of the workpiece W are assumed to be 1 mm and 5.0 mm, respectively. The cutting amount of the first cycle of thread cutting is assumed to be obtained by "5.0 mm−4.8 mm=0.2 mm" based on the radius of the workpiece W and the depth of cut of the first cutting cycle. On a path that is originally intended to be passed, moreover, the Z-axis coordinate after chamfering in the thread cutting cycle is assumed to be Z=10.0 mm. Further, a button is attached to the machine tool assumed here such that a signal for starting an operation to change the cutting amount can be input to the numerical controller 10 by depressing the button.

Furthermore, the user is assumed to have previously set Δd=0.05 mm, $D_{margin}$=0.5 mm, $D_{accel}$=1.0 mm, and $X_{retract}$=7.0 mm based on parameters or the like. The following is a description of operations performed in this example.

Figure 5:
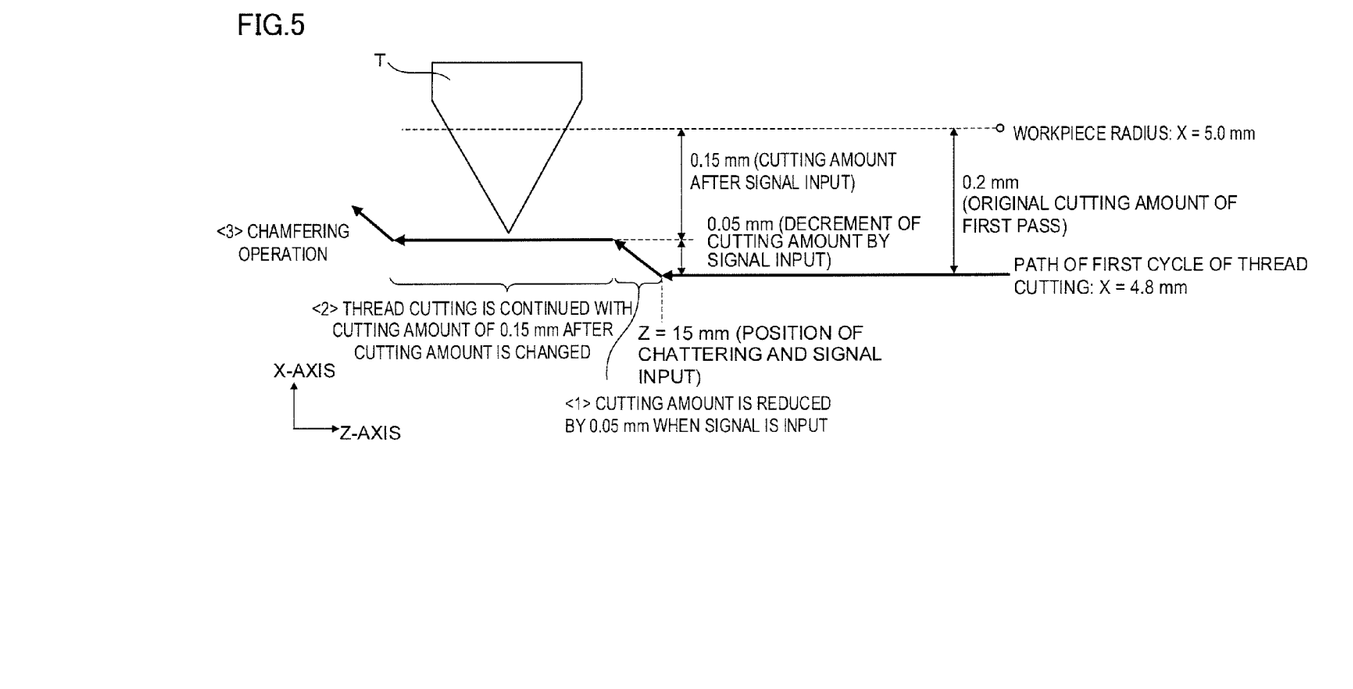
FIG. 5 shows an embodiment of a cutting amount changing operation for thread cutting.

(1) If the operator having felt chattering depresses the button, a signal is input to the numerical controller 10 such that the cutting amount is changed from 0.20 mm to 0.15 mm, as shown in FIG. 5. Let it now be assumed that the cutting force is changed to suppress chattering as the cutting amount is reduced to 0.15 mm. If the cutting amount is changed, the coordinate $Z_{restart}$ of the start point of the second thread cutting operation in the Z-axis direction is calculated as follows. This calculation is included in claim 1.

$$Z'_{restart}=Z_{change\text{-}start}+D_{margin}+D_{accel}=15 \text{ (mm)}+0.5 \text{ (mm)}+1.0 \text{ (mm)}=16.5 \text{ (mm)}.$$

$Z_{restart}$ is that one (17 mm) of positions at distances equal to integral multiples of the lead (1 mm) from $Z_{first\text{-}start}$ (20 mm) which is larger than $Z'_{restart}$ (16.5 mm) and closest to (17.0 mm).

(2) After the cutting amount is changed, the thread cutting is continued with the cutting amount of 0.15 mm.

After the thread cutting with the cutting amount of 0.15 mm is performed, chamfering is performed.

Figure 6:
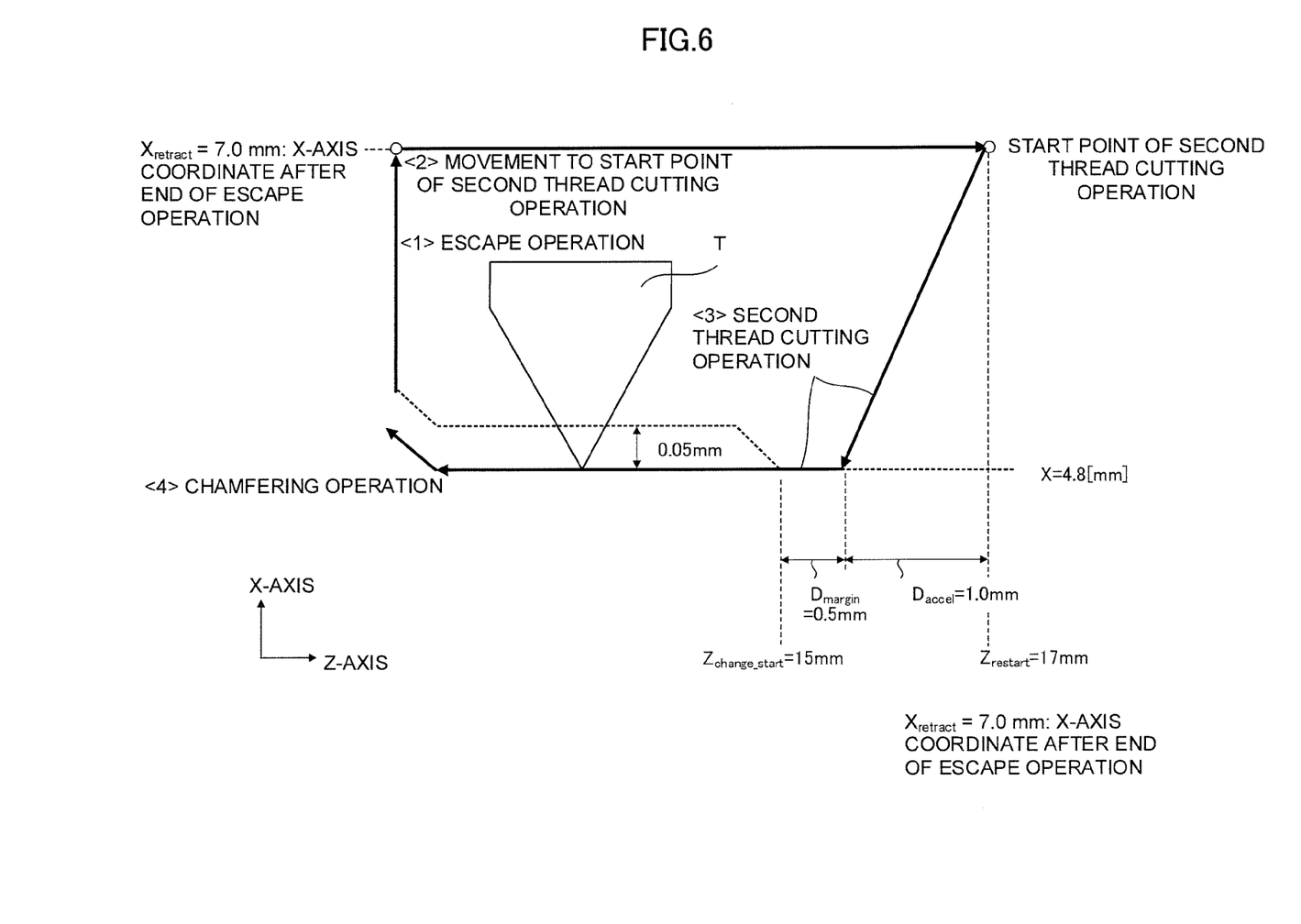
FIG. 6 shows an embodiment of machining in a section for the change of the cutting amount.

(3) An escape operation <1> in the X-axis direction of FIG. 6 is performed to the position of $X_{retract}$=7.0 mm.

(4) A movement to the start point of the second thread cutting operation is made (<2> of FIG. 6).

(5) The thread cutting/chamfering operation is performed starting at $Z_{restart}$=17 mm calculated in (1) (<3> and <4> of FIG. 6). Since the cutting amount at this point in time is smaller (0.05 mm) than an original cutting amount, chattering can be expected to be suppressed. At this point in time, a portion with a thickness of 2 mm that is intended to be removed by original thread cutting is scraped off.

(6) Machining free of the influence of chattering can be achieved by performing subsequent thread cutting in like manner.

If any chattering occurs in the subsequent thread cutting, machining is performed avoiding the chattering in the same manner as the procedures (1) to (5).

Figure 7:
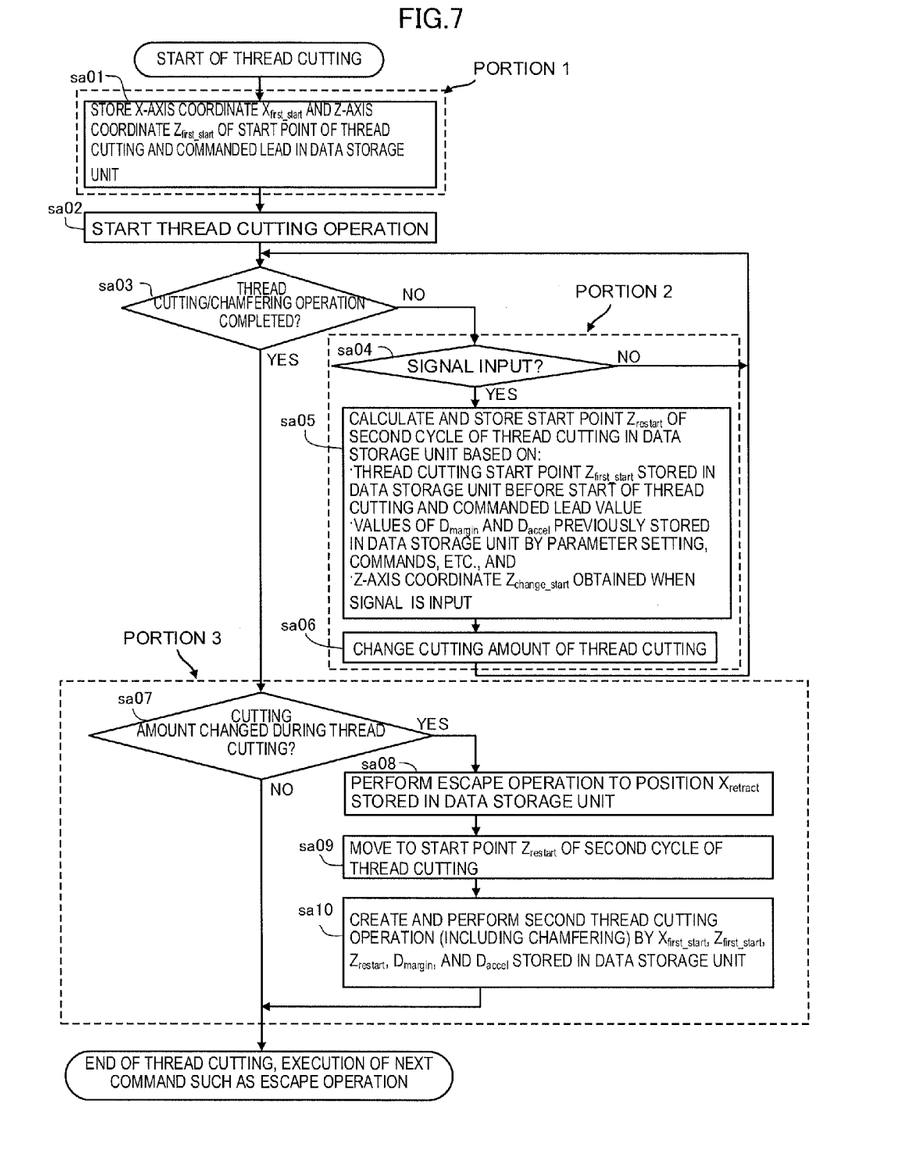
FIG. 7 is a flowchart showing the change of the cutting amount and processing for performing the thread cutting again.

FIG. 7 shows an example of a flowchart of processing for the operations described above. The change of the cutting amount of the procedure (1) and the calculation of the start point of the second thread cutting operation are achieved by portions 1 and 2 included in the claims.

Further, the creation and execution of the second thread cutting operation of the procedure (2) are achieved by portions 1 and 3 included in the claims.

The following is a sequential description of steps of the processing.

[Step sa01] An X-axis coordinate $X_{first\text{-}start}$ and the Z-axis coordinate $Z_{first\text{-}start}$ of the start point of the thread cutting and a commanded lead are stored in a data storage unit.

[Step sa02] The thread cutting operation is started.

[Step sa03] It is determined whether or not the thread cutting/chamfering operation is completed. If this operation is completed (YES), the processing proceeds to Step sa07. If not (NO), the processing proceeds to Step sa04.

[Step sa04] It is determined whether or not a signal is input. If the signal is input (YES), the processing proceeds to Step sa05. If not (NO), the processing returns to Step sa03.

[Step sa05] The start point $Z_{restart}$ of a second cycle of thread cutting is calculated based on the following values and stored in the data storage unit:

the thread cutting start point $Z_{first\text{-}start}$ stored in the data storage unit before the start of the thread cutting and a commanded lead value, the values of $D_{margin}$ and $D_{accel}$ previously stored in the data storage unit based on parameter setting, commands, etc., and the Z-axis coordinate $Z_{change\text{-}start}$ obtained when the signal is input.

[Step sa06] The cutting amount of the thread cutting is changed, whereupon the processing returns to Step sa03.

[Step sa07] It is determined whether or not the cutting amount is changed during the thread cutting. If the cutting amount is changed (YES), the processing proceeds to Step sa08. If not (NO), the thread cutting processing ends or the next command (escape operation) is performed.

[Step sa08] The escape operation is performed to the position of $X_{retract}$ stored in the data storage unit.

[Step sa09] The movement to the start point $Z_{restart}$ of the second cycle of thread cutting is made.

[Step sa10] The second thread cutting operation (including chamfering) is created and performed based on $X_{first\text{-}start}$, $Z_{first\text{-}start}$, $Z_{restart}$, $D_{margin}$, and $D_{accel}$ stored in the data storage unit, whereupon the thread cutting processing ends or the next command (escape operation) is performed.

Embodiment 2

The following is a description of Embodiment 2 included in claim 2.

The cutting force in the X-axis direction affects the occurrence of a chatter phenomenon during thread cutting.

Figure 8:
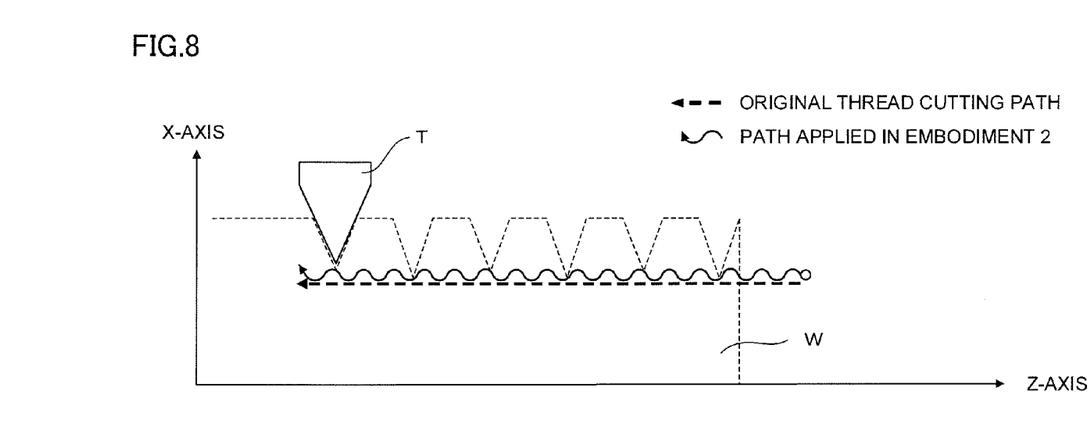
FIG. 8 is a diagram showing a thread cutting operation on which a periodic operation in an X-axis direction is superimposed.

Thereupon, this force can be expected to be changed to suppress chattering by previously adding a periodic operation in the X-axis direction to an original cutting path, as shown in FIG. 8.

FIG. 8 shows, as an example of the added periodic operation, a sinusoidal operation based on the depth of cut of the original thread cutting regarded as a lower limit. The X-direction depth of cut (X) for this sinusoidal operation can be given as follows:

$$X=X_0+A_1(1-\sin(2\pi \times Z/A_2)),$$

where $X_0$ is the depth of cut of the original thread cutting; $A_1$, amplitude; $A_2$, period; and Z, Z-axis coordinate of the tool T.

As the depth of cut of the original thread cutting is regarded as the lower limit, cutting deeper than the original thread cutting can be prevented. The above equation indicates that the cutting amount is changed depending on the movement of the Z-axis. Alternatively, however, the cutting amount may be changed depending on the elapsed time, as indicated by the following equation, or on the rotation of the spindle that holds the workpiece.

In the case where the cutting amount is changed depending on the elapsed time, X is $$X=X_0+A_1(1-\sin(2\pi \times t/A_3)),$$

where $X_0$ is the depth of cut of the original thread cutting; $A_1$, amplitude; $A_3$, period; and t, elapsed time.

In the case where the cutting amount is changed depending on the rotation of the spindle, X is $$X=X_0+A_1(1-\sin(2\pi \times S/A_4)),$$

where $X_0$ is the depth of cut of the original thread cutting; $A_1$, amplitude; $A_4$, period; and S, angle of rotation of the spindle.

The period and amplitude of the periodic operation having the function of suppressing chattering vary depending on the machine or tool used, material and shape of the workpiece, and spindle speed. Therefore, the amplitude $A_1$ and the periods $A_2$ to $A_4$ are made adjustable by parameters or commands. The size and period of the variation of the cutting amount can be previously set by being input by means of the display/MDI unit 70 of the numerical controller 10. Further, the enable/disable mode of the periodic operation may be made arbitrarily changeable by signals or commands.

After the thread cutting assisted by the added periodic operation is performed, the original thread cutting with the fixed depth of cut is performed so that the workpiece can be machined into the originally intended shape. Since the depth of cut for the previous cycle is changed, the cutting amount varies periodically in this thread cutting. Possibly, therefore, the resulting change of the cutting force may serve to suppress chattering.

Example of execution included in claim 2:

Let us assume a case of cutting to the depth of 0.2 mm obtained by subtracting X=4.8 mm from X=5.0 mm, for example. Normally, the distal end of the tool is fed in the Z-axis direction with X=4.8 mm.

The following is a description of an operation to which this function is applied. An amplitude $A_1$=0.01 mm and a period $A_2$=0.05 mm are assumed to be previously set for the periodic operation by parameters or commands.

Figure 9:
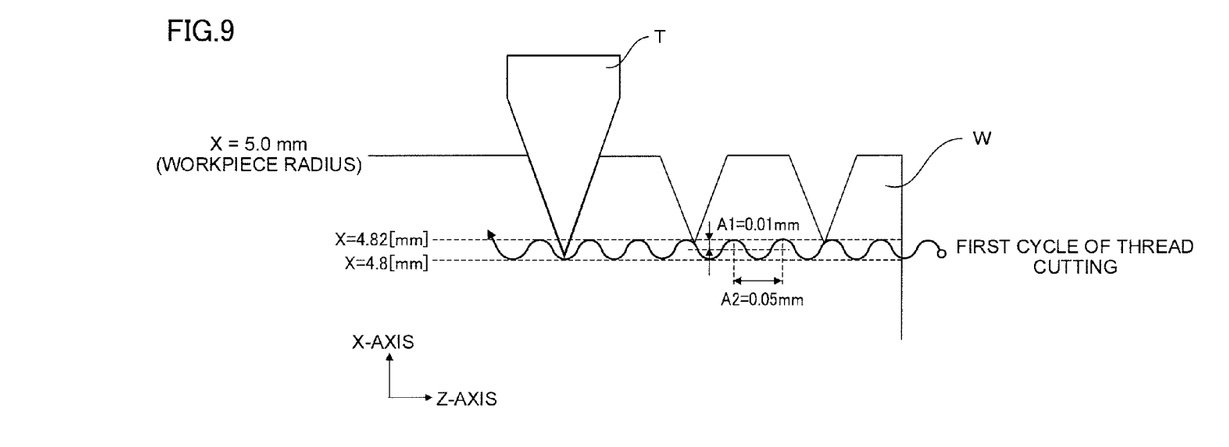
FIG. 9 shows an example of execution of thread cutting on which the periodic operation in the X-axis direction is superimposed.

In a first cycle of thread cutting, the tool is periodically operated in the X-axis direction as it is fed in the Z-axis direction, as shown in FIG. 9. In this case, as compared with the case in which the thread cutting is performed with the fixed cutting amount, the cutting force in the X-axis direction changes, so that chattering can be expected to be suppressed.

Figure 10:
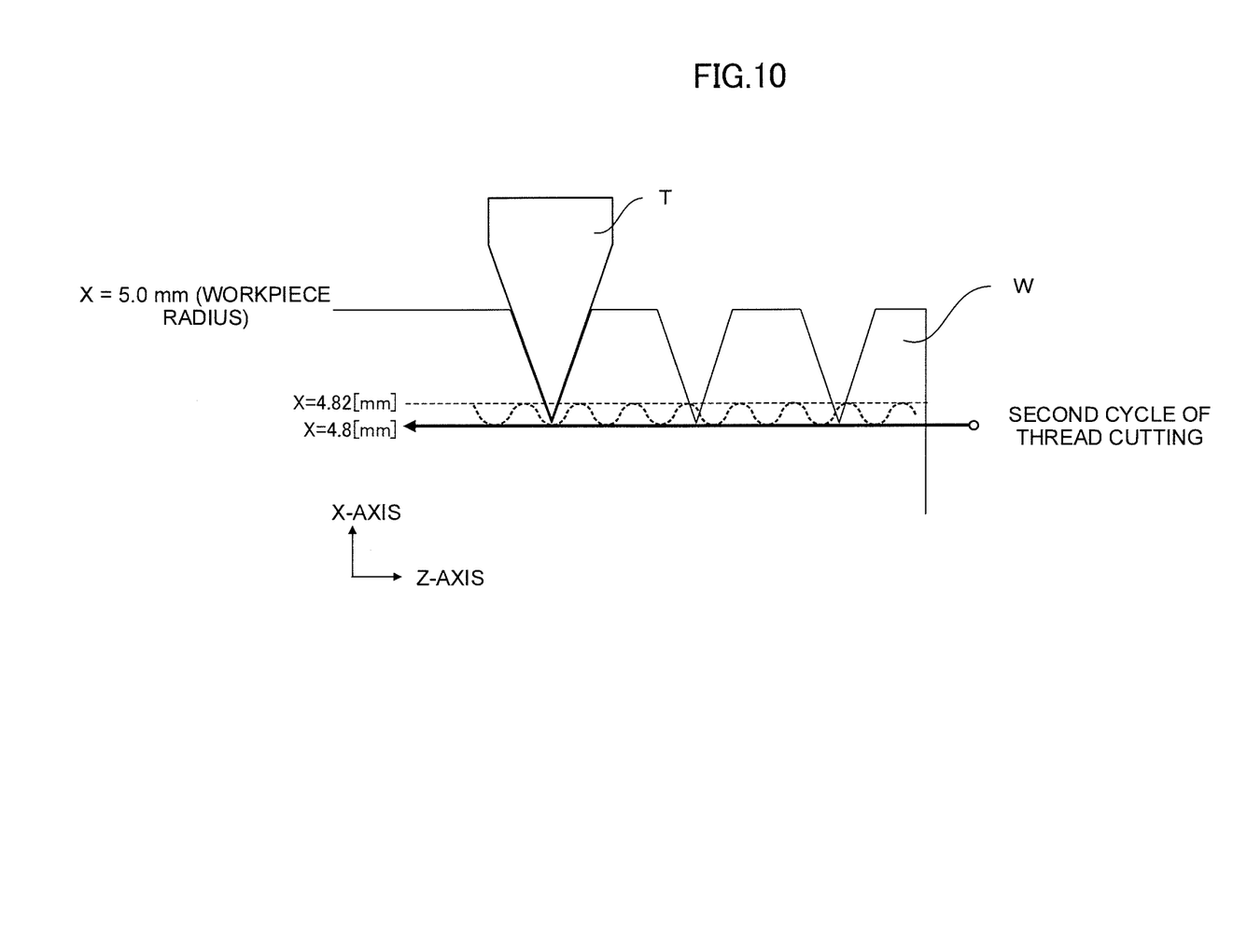
FIG. 10 shows an example of execution of thread cutting with a fixed depth of cut after the superimposition of the periodic operation.

In a second cycle, as shown in FIG. 10, normal thread cutting is performed with the X-axis coordinate of the tool distal end fixed at X=4.8 mm.

Since the depth of the thread groove obtained after scraping in the first cycle of thread cutting periodically changes from X=4.82 mm to X=4.80 mm, the cutting amount at the time of the second cycle of thread cutting periodically changes from 0.00 to 0.02 mm. As the cutting amount thus changes, the cutting force changes, so that chattering can be expected to be suppressed.

Figure 11:
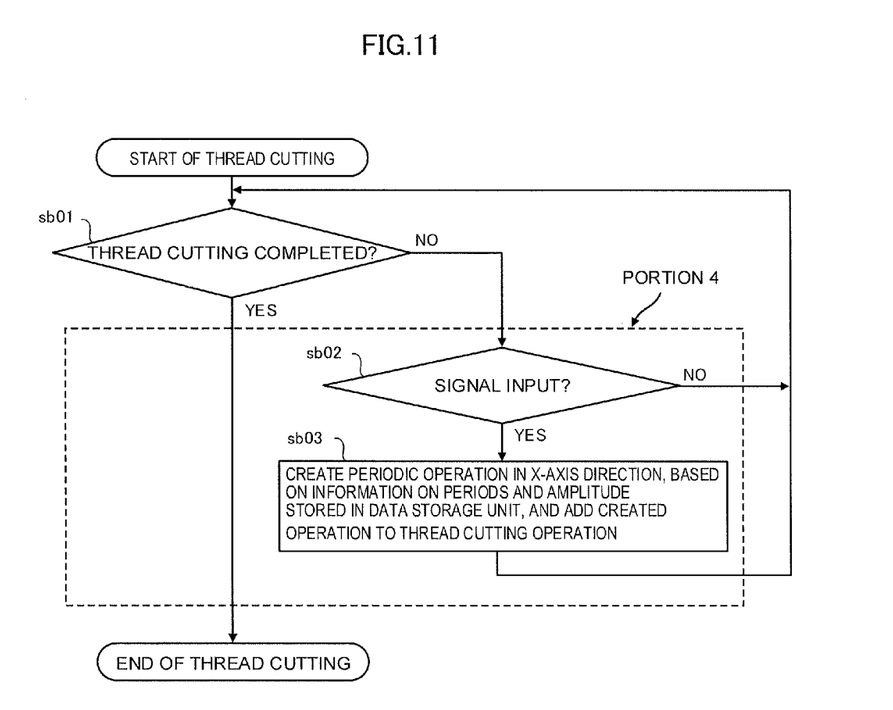
FIG. 11 is an example of a flowchart of the thread cutting on which the periodic operation in the X-axis direction is superimposed.

In order to implement these operations; the thread cutting operation is modified, as shown the flowchart of FIG. 11. Enable/disable information on the periodic operation stored in the data storage unit is checked during the thread cutting. If the operation is determined to be enabled, processing with the added periodic operation is performed. Thus, the thread cutting operation is improved. Further, the user can achieve the first cycle of thread cutting with the periodic operation enabled and the second cycle of thread cutting with the periodic operation disabled. The following is a sequential description of steps of this processing.

[Step sb01] It is determined whether or not the thread cutting is completed. If the thread cutting is completed (YES), this processing ends. If not (NO), the processing proceeds to Step sb02.

[Step sb02] It is determined whether or not a signal is input. If the signal is input (YES), the processing proceeds to Step sb03. If not (NO), the processing returns to Step sb01.

[Step sb03] The periodic operation in the X-axis direction is created, based on information on the periods and amplitude stored in the data storage unit, and added to the thread cutting operation, whereupon the processing returns to Step sb01.

The invention claimed is:

1. A numerical controller configured to rotate a workpiece about a rotation axis, move a tool along the rotation axis in synchronism with the rotation about the rotation axis, and control a machine tool for performing thread cutting in the workpiece, the numerical controller comprising:
    a cutting amount variation setting unit for previously setting the size of a variation of a cutting amount during the thread cutting,
    the numerical controller configured to continue the thread cutting with the cutting amount changed based on the set variation when the change of the cutting amount is ordered by the cutting amount variation setting unit during the thread cutting, move the tool with acceleration of a predetermined value or higher along the rotation axis from a predetermined position to a start point in a position along the rotation axis near a position along the rotation axis in which the cutting amount is changed and deviated from a start point of the thread cutting by a distance equal to an integral multiple of a lead after the thread cutting with the changed cutting amount is performed, and perform the thread cutting with the unchanged cutting amount, starting at the deviated start point.

2. A numerical controller configured to move a tool in synchronism along a rotation axis with rotation of a workpiece about the rotation axis, control a machine tool configured for performing thread cutting, the numerical controller comprising:

a cutting amount variation setting unit for previously setting a size and a period of a variation of a cutting amount during the thread cutting;
a storage unit for storing enable/disable information on periodic operation;
a processor configured to execute instructions to perform a method including:
  checking the enable/disable information stored in the storage unit;
  determining whether the checked enable/disable information on periodic operation is enabled;
  periodically changing the cutting amount based on a preset variation during the thread cutting, upon determining that the enable/disable information on periodic operation is enabled; and
  performing, after the thread cutting with the periodically changed cutting amount, an original thread cutting of a constant cutting depth.

\* \* \* \* \*